INVENTORS
ARCH C. LUTHER, JR.
ROBERT N. HURST &
JOSEPH R. WEST

BY Edward J. Norton
ATTORNEY

July 14, 1964 A. C. LUTHER, JR., ETAL 3,141,065

SERVO SYSTEM

Filed March 27, 1962 3 Sheets-Sheet 2

INVENTORS
ARCH C. LUTHER, JR.,
ROBERT N. HURST &
JOSEPH R. WEST

BY Edward J. Norton
Attorney

INVENTORS
ARCH C. LUTHER, JR.,
ROBERT N. HURST &
JOSEPH R. WEST
BY Edward J. Norton
Attorney

United States Patent Office 3,141,065

Patented July 14, 1964

3,141,065

SERVO SYSTEM

Arch C. Luther, Jr., Merchantville, Robert N. Hurst, Haddonfield, and Joseph R. West, Blackwood, N.J., assignors to Radio Corporation of America, a corporation of Delaware Filed Mar. 27, 1962, Ser. No. 182,799
10 Claims. (Cl. 178—6.6)

The invention relates to servo systems. It particularly relates to improved servo systems which act by comparing timing information derived from a first signal and timing information derived from a second signal to alter one of the signals in a manner which brings that signal into precise synchronism with the other signal. The servo system of the invention is particularly suitable for use in television tape recorders and reproducers, and will be described with respect to such applications.

Television tape recorders and reproducers presently in use are of the transverse track type. Four magnetic heads are spaced 90° apart about the periphery of a head wheel. A motor rotates the head wheel at approximately 14,400 revolutions per minute. A capstan motor drives a magnetic tape at approximately 15 inches per second past the head wheel which rotates in a plane perpendicular to the direction of tape movement. A guide mechanism serves to guide the tape past the head wheel so that during the recording of a television signal each magnetic head in turn places a transverse recorded track on the tape. Four transverse tracks are recorded along the length of the tape for each complete rotation of the head wheel.

A control pulse is generated for each complete rotation of the head wheel which is indicative of the particular time at which a given one of the magnetic heads in the head wheel scans across the tape. The control pulses are formed into a control signal of 240 c.p.s. (cycles per second) which is recorded on a control track located on the bottom of the tape. During recording, sixteen tracks are recorded for each television field, making thirty-two transverse tracks for each television frame. Therefore, eight cycles of the control signal occur per television frame, corresponding to eight full rotations of the head wheel.

In reproducing the recorded signal, the 240 c.p.s. control signal is recovered and compared against a local 240 c.p.s. reference or a submultiple of 240 c.p.s. The resulting error signal, indicating the phase error between the recorded control signal and the reference signal, is used to control the speed of the capstan motor in such a manner that the phase error between the two signals is minimized. The speed of the head wheel motor is controlled so that the head wheel is rotated at the proper velocity and phase. By this action, if a head designated number one on the head wheel placed track number one on the tape during recording, then head number one scans track number one during reproduction of the recorded signal, and so on.

The above system works satisfactorily where the reproduced television signal is used by itself. However, broadcasting techniques often require that a television signal be formed by switching between a locally generated television signal and a television signal reproduced from a tape. Since eight cycles of the control signal occur per television frame, any effort to use in this manner a television signal reproduced by the above operation shows that there are eight possible phase relationships that can be established between the 30 c.p.s. television frame rate of a locally generated television signal and each eight cycle interval of the 240 c.p.s. control signal reproduced from the tape. For each eight cycles of the control signal, only one corresponds to the beginning of a frame in the reproduced television signal.

The satisfactory formation of a television signal from a reproduced television signal and a locally generated television signal requires that the beginning of a frame in the locally generated television signal occur substantially in synchronism with the beginning of a frame in the reproduced television signal. This occurs when the 30 c.p.s. television frame rate of the locally generated television signal is locked to that portion of the control signal corresponding to the beginning of a frame in the reproduced television signal and occurring once per each eight cycles of the control signal. Precise synchronism between the reproduced and locally generated television signals requires that a particular one of the eight possible phase relationships be established. The other seven are wrong.

Timing means can be provided for controlling the speed of the capstan motor so as to establish and maintain the correct phase relationship between the reproduced control signal and the 30 c.p.s. frame rate of the locally generated television signal. By the use of such timing means substantial frame-by-frame lock-up of the reproduced television signal and the locally generated television signal is possible.

Ideally the vertical sync intervals in the recorded television signal should be recorded at the center of the track on which they occur. If there is substantial frame-by-frame lock-up of the reproduced television signal and the locally generated television signal, and if, in fact, the vertical sync intervals of the recorded television signal are recorded at the center of the transverse tracks upon which they appear, then, the vertical sync intervals in the reproduced television signal will also be substantially locked to the vertical sync intervals in the locally generated television signal. By establishing line-by-line lock-in, precise phasing and accurate synchronisms between the two television signals is obtained.

As a practical matter, however, the vertical sync interval in the recorded television signal can occur to one side or the other of the track center resulting in a phase error between the two television signals. Additional timing means are required to minimize this phase error by controlling the velocity and phase of the head wheel motor. The timing means must be capable of controlling the operation of the head wheel motor with a high degree of accuracy and preciseness to cause the vertical sync intervals in the reproduced television signal and the vertical sync intervals in the locally generated television signal to occur at the same time. When substantial synchronism between the vertical sync intervals in the two television signals is established, precise phasing and accurate synchronism between the two television signals can be achieved by establishing and maintaining a line-by-line lock-in.

Should such additional timing means not be provided, any effort to transmit a television signal by switching between a locally-generated television signal and a reproduced television signal results in a disturbance of the television image at television receivers due to discontinuity in synchronizing information applied to the television receiver beam deflecting means. An automatic and dependable timing means suitable for controlling the operation of a head wheel motor so as to maintain accurate synchronism and precise phasing between a reproduced television signal and a locally generated television signal is required.

It is, therefore, an object of the invention to provide an improved servo system by which a first signal reproduced from a recording medium can be precisely and automatically synchronized with a second signal.

Another object is to provide an improved servo system suitable for use in a television tape recorder and reproducer for automatically and accurately minimizing a phase difference between the reproduced television signal and a second television signal by using timing information included in the reproduced television signal.

A further object is to provide an improved head wheel servo system for use in a television tape recorder and reproducer.

A still further object is to provide an improved head wheel servo system suitable for use in a television tape recorder and reproducer using the transverse track technique which acts first to establish substantial synchronism between the vertical sync intervals of the reproduced television signal and of a second television signal, and thereafter establishing a line-by-line lock-in of the two television signals.

In one embodiment of the invention adapted for use in a television tape recorder and reproducer using the transverse scan approach, it is assumed that a suitable timing means is provided for controlling the speed of the capstan motor so that the reproduced television signal and a locally generated television signal are substantially synchronized on a frame-by-frame basis. A tone wheel arrangement operated by the head wheel motor generates a pulse for each complete rotation of the head wheel assembly which is indicative of the particular time at which a given one of the magnetic heads scans across the tape. The pulse train appearing at the output of the tone wheel arrangement has a frequency determined according to the rotational speed of the head wheel assembly. When the head wheel assembly is operated at the proper rotational speed, the tone wheel pulse train has a frequency of approximately 240 p.p.s.

A tone wheel velocity control is responsive to the tone wheel pulse train to generate an error signal according to the amount by which the actual frequency of the tone wheel pulse train differs from the desired control frequency nominally of 240 p.p.s. The speed of the head wheel motor is controlled according to the error signal so as to reduce the error signal, causing the head wheel assembly to be rotated by the head wheel motor at the desired nominal speed of 240 revolutions per second.

The tone wheel pulse train is also fed to a tone wheel phase control. The 60 c.p.s. field pulses derived from a locally generated television signal are fed to the tone wheel phase control through an electronically variable delay. The 60 c.p.s. field pulses derived from the reproduced television signal and the 60 c.p.s. field pulses derived from the locally generated television signal are compared and a control signal produced according to the phase difference or error therebetween. The variable delay is responsive to the control signal so as to change the timing of the 60 c.p.s. field pulses of the locally generated television signal as fed to the tone wheel phase control.

The tone wheel phase control compares the tone wheel pulse train and the modified 60 c.p.s. field pulses of the locally generated television signal and produces a second error signal in the proper sense to control the phase of the head wheel motor so as to reduce the second error signal. By this action, the phase of the head wheel assembly is determined so that a vertical sync interval is reproduced from the tape substantially at the same time at which a vertical sync interval occurs in the locally generated television signal. The phase error between the 60 c.p.s. field pulses of the reproduced television signal and the 60 c.p.s. field pulses of the locally generated television signal is minimized.

A sensing means acts to determine a condition of substantial coincidence between the two 60 c.p.s. field pulse trains. Upon such a condition being determined to exist, the head wheel motor is released from control by the error signals produced by the tone wheel velocity control and the tone wheel phase control. The horizontal sync pulses derived from the reproduced television signal and the horizontal sync pulses derived from the locally generated television signal are compared and a third error signal produced according to any phase error therebetween. The speed of the head wheel motor and, therefore, the speed of the head wheel assembly is thereafter controlled according to the third error signal. A line-by-line lock-in between the two television signals is established and maintained.

By the use of the servo system provided by the invention, it is possible to accurately and automatically synchronize two signals from timing information included in the signals. In adapting the invention for use in a television tape recorder and reproducer of the transverse track type, where it is desired to precisely phase a locally generated television signal and a reproduced television signal that are substantially synchronized on a frame-by-frame basis, the servo system is responsive to timing information in the two television signals to minimize any phase error remaining between the two television signals by controlling the speed of the head wheel motor. Accurate and reliable framing of a television signal reproduced from a recording medium, both vertically and horizontally, is provided to a degree not heretofore obtainable.

The invention will now be described in greater detail in connection with the accompanying drawing in which:

FIGURE 1 comprising, as parts, FIGURE 1*a* and FIGURE 1*b*, is a block diagram of one embodiment of the invention;

Figure 1A:
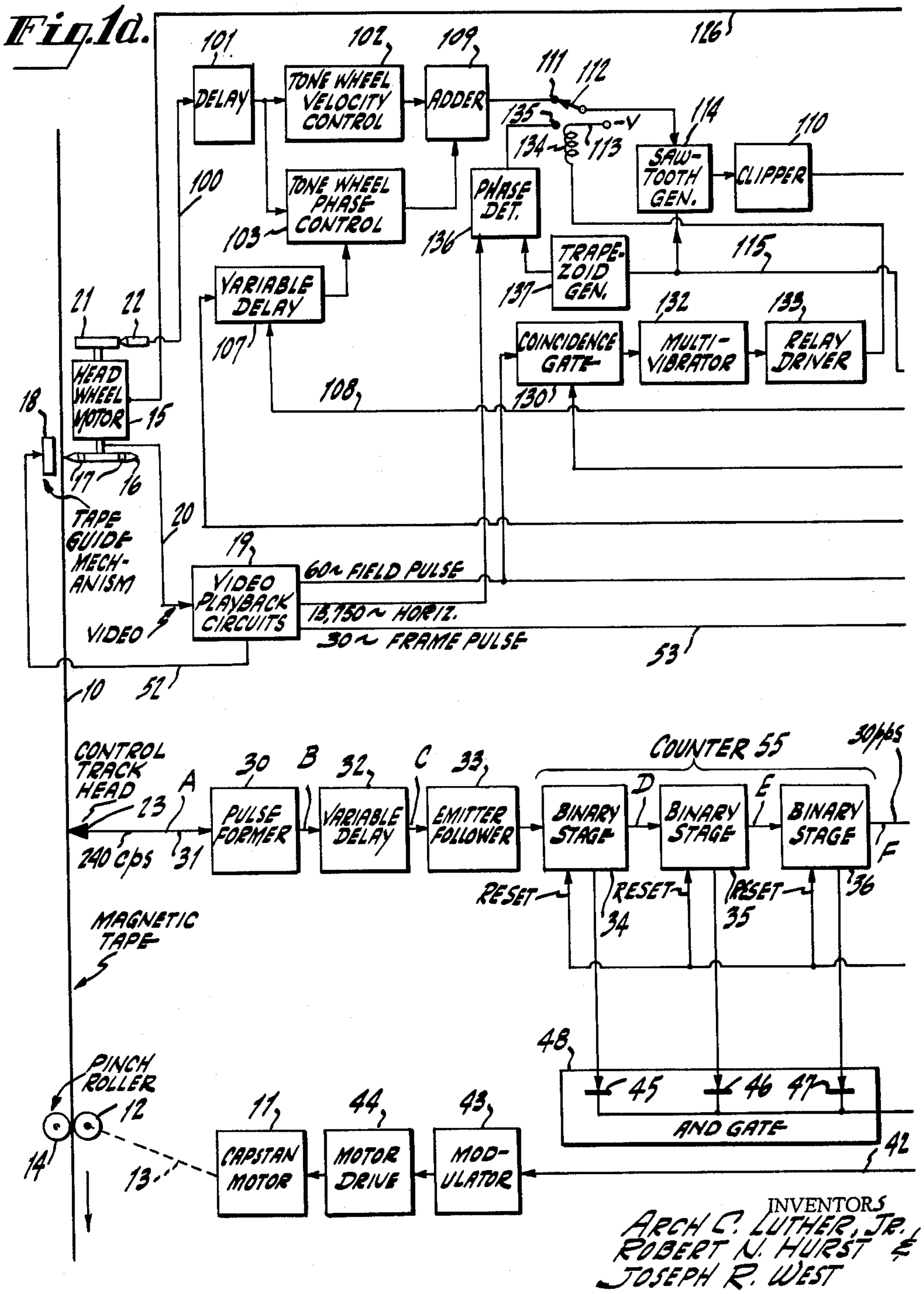
Figure 1B:
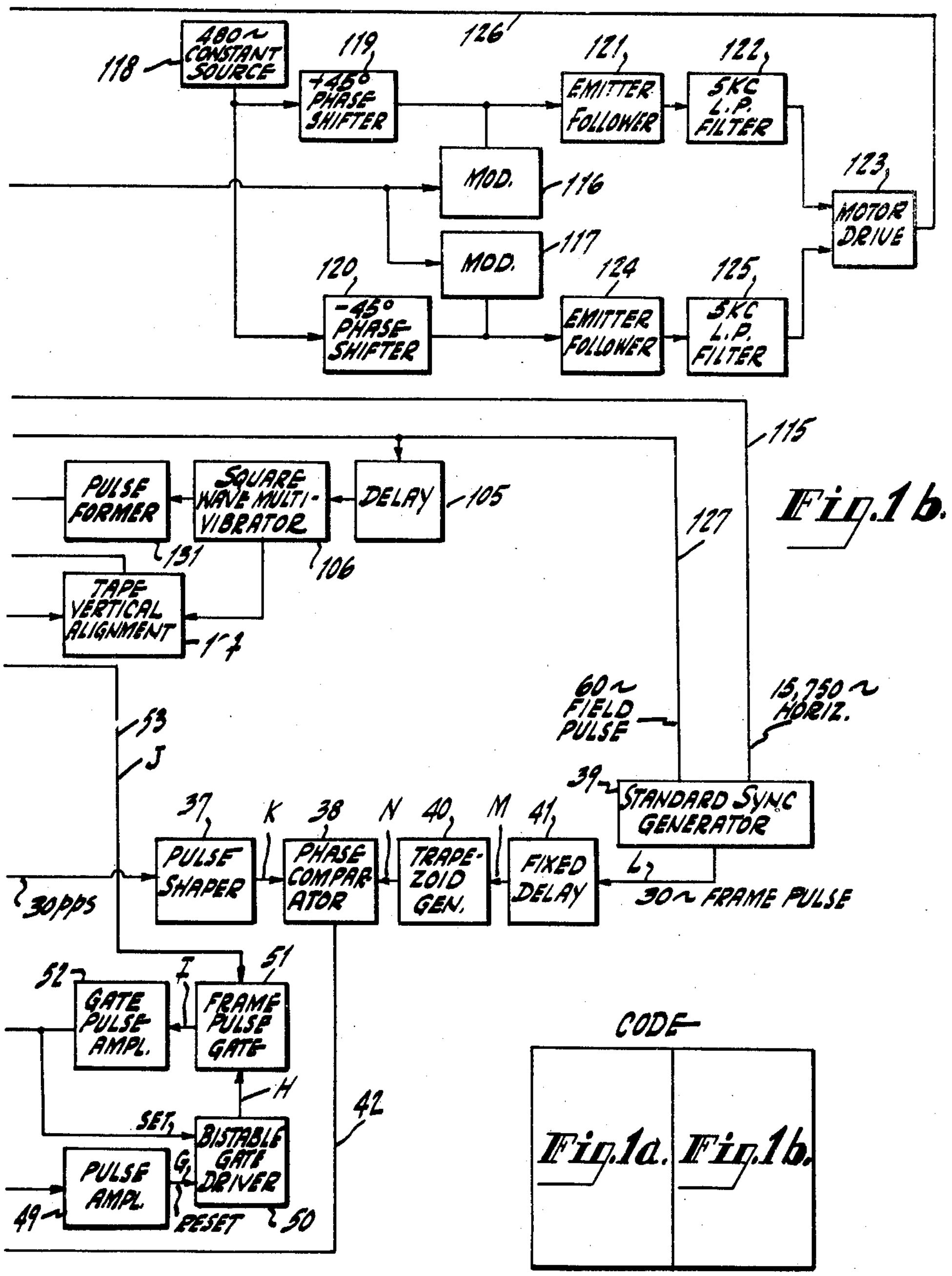

In the interest of clarity, ground symbols have been omitted from the block diagram of FIGURE 1. It is to be assumed that a ground return is associated with each of the blocks shown in the drawing where necessary.

In describing the embodiment of the invention shown in FIGURE 1 of the drawing, reference will be made to various frequencies, speeds and ratios set forth in the standards established in the United States for television tape recorders and reproducers. The invention is not to be considered as limited to use in apparatus employing such standards. Also, while the invention will be described in connection with its use in a particular type of signal recorder and reproducer, wherein it is especially useful and the results are especially advantageous, the invention may be used in any type of signal recorder and reproducer, television or non-television, where high stability of the reproduced signal is desired.

A magnetic tape 10 upon which a television signal has been recorded using a transverse scan technique is shown at the left of FIGURE 1. A detailed description of apparatus for producing such a television tape recording may be found in the literature. For example, reference is made to a book entitled, "Video Tape Recording," by Julian Bernstein, 1960, Rider Publisher Inc., New York. The apparatus used to recover the television signal is the converse of that used to record the signal. The television signal may be reproduced by the same apparatus which recorded the signal on the tape or a different apparatus using the same techniques may be used.

The structure used to reproduce the recorded signal is shown in a greatly simplified manner in FIGURE 1. A detailed description of this part of the structure shown in FIGURE 1 may be found in the above-cited book and other references.

A capstan motor 11 drives a capstan 12 via a linkage 13 so that the tape 10 is driven at approximately 15 inches per second in the direction of the arrow between a pinch roller 14 and the capstan 12. The tape 10 may be arranged in an endless loop or suitable supply and take-up reels (not shown) may be provided. Also, the tape may be taken from and returned to storage bins. A head wheel motor 15 causes a head wheel 16 to rotate at approximately 14,400 revolutions per minute in a plane perpendicular to the direction of the tape 10 movement. The head wheel 16 has four magnetic heads 17 spaced 90° apart about the periphery thereof. A guide mechanism 18 serves to guide the tape 10 past the head wheel 16 so that the magnetic heads 17 engage the tape 10 in turn, the heads 17 thereby scanning in time sequence across the width of the tape. The signals reproduced from the transverse tracks on tape 10 by the heads 17 are fed via slip rings (not shown) and lead 20 to the video playback circuits 19, a description of which may also be found in the above-cited book.

The head wheel motor 15 also causes a tone wheel 21 to rotate. The tone wheel 21 may be constructed of magnetically susceptible material with a notch or aperture therein. Each time the notch passes a pick-up device 22, a pulse is generated. In this or a similar manner, a single pulse is generated for each complete revolution of the head wheel 16. The tone wheel 21 is designed by positioning the notch on the tone wheel 21 with respect to the position of the heads 17 on the head wheel 16 so that the pulse produced once each revolution indicates when a particular one of the heads 17 is at the center of its scan across the tape. A 240 p.p.s. pulse train generated in a similar manner during the recording of the television signal, is recorded longitudinally as a 240 c.p.s. sinusoidal control signal on a control track located at the bottom of tape 10. The control track signal bears a precise relationship to the original television signal, limited chiefly by the mechanical location of the head used to record the control signal on the tape 10. A control track head 23 spaced down the tape 10 from the head wheel 16 reproduces the recorded control track signal from the tape 10 during the reproduction of the recorded television signal.

Figure 2:
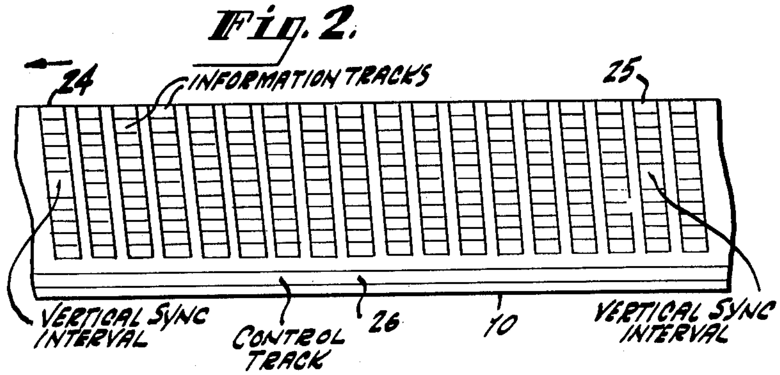
FIGURE 2 is a perspective representation of a section of magnetic tape used in the arrangement of FIGURE 1.

A section of the magnetic tape 10 showing the relative position of the control track with respect to the information transverse tracks is shown in FIGURE 2. The showing is not intended to be to scale and is not representative of the bare appearance of the recorded tape. The direction of tape travel is indicated by the arrow. The tracks recorded on the tape 10 by a head wheel similar to the head wheel 16 shown in FIGURE 1 are seen to extend across the width of the tape 10. Each track is recorded by a single magnetic head as it scans across the tape. Four succeeding tracks are recorded on the tape 10 for each complete revolution of the head wheel. As indicated by the vertical sync intervals on the transverse tracks 24 and 25, sixteen tracks corresponding to four full revolutions of the head wheel are recorded for each television field. Thirty-two tracks corresponding to eight full revolutions of the head wheel are recorded for each television frame.

Assuming a tape speed of 15 inches per second, and a head wheel rotating at 14,400 revolutions per minute, the tracks are displaced from one another by 15.6 mils. Since the gap length in the magnetic heads is typically 10 mils, a guard band of 5.6 mils exists between adjacent tracks. The 240 p.p.s. control signal is recorded longitudinally using conventional techniques on the control track 26 extending along the bottom of tape 10. No effort has been made to show the audio signal and cue signal which are also recorded on the tape 10. In practice, the audio signal is usually recorded on a track extending along the top of the tape 10, while the cue signal is recorded on a track extending parallel to the control track 26 between the control track 26 and the information tracks.

The reproduction of a television signal recorded on the tape 10 in the manner shown in FIGURE 2 by using a head wheel servo system constructed according to the invention will now be described. Before proceeding with a description of the head wheel servo system, one example of a capstan servo system suitable for obtaining substantial frame-by-frame lock-in of the reproduced television signal and a locally generated television signal which is shown in FIGURE 1 will be described.

Power is first applied to the capstan motor 11 and to the head wheel motor 15 shown in FIGURE 1. The capstan motor drives the tape 10 via capstan 12 and linkage 13 in the direction of the arrow. The head wheel motor 15 is made to come up to the proper rotational speed by a control arrangement to be described. The 240 c.p.s. control signal is recovered from the tape 10 by the control track head 23 and fed to a servo system. The reproduced control signal, being the derivative of the original control signal, is shifted by 90° with respect thereto.

The servo system includes a pulse former 30 to which the 240 c.p.s. control signal is fed via lead 31. The pulse former 30 clips and differentiates the 240 c.p.s. control signal to produce a train of pulses. The pulse train is delayed a nominal amount, for example, 1000 microseconds, by a variable delay 32 and fed to a binary counter 55 through an emitter-follower 33. The binary counter 55 includes three binary stages 34, 35, 36. Each stage of the counter 55 divides by two, making the three stages 34, 35 and 36, when taken together, a divide-by-eight counter. A pulse appears at the output of the last binary stage 36 for each eight pulses applied to the input of the first binary stage 34. The 30 p.p.s. pulse train appearing at the output of the final stage 36 of the counter 55 is fed through a pulse shaper 37 to one input of a phase comparator 38.

A standard sync generator 39 as may be used in the generation of a local television signal is shown to the right of FIGURE 1. It is to be understood that the sync generator 39 includes means for deriving the 30 cycle frame pulses from the locally generated television signal. The 30 cycle frame pulses as derived from the locally generated television signal are applied from the generator 39 to a trapezoid generator 40 through a nominal 1000 microsecond fixed delay 41. The trapezoid wave produced by the generator 40 is applied to a second input of the phase comparator 38. An error signal produced by the phase comparator 38 in response to the two input signals applied thereto is fed via lead 42 to a motor drive modulator 43. The modulator 43 serves to control the speed of the capstan motor 11 through the motor drive 44 in accordance with the error signal applied thereto from the phase comparator 38. The motor drive 44 may, for example, include a 120 c.p.s. oscillator which is frequency modulated by the error signal. The output of the oscillator is fed in phase opposition to two binary dividers, producing two 60 c.p.s. signals which are 90° apart in phase. The two quadrature 60 c.p.s. signals are amplified and used to drive a two-phase synchronous capstan motor 11.

The binary stages 34, 35 and 36 are connected to diodes 45, 46 and 47, respectively, the diodes 45, 46, 47 forming an AND gate 48. A pulse appearing at the output of the AND gate 48 is applied through a pulse amplifier 49 so as to reset a bistable gate driver 50 which may be a conventional multivibrator. The output of the bistable gate driver 50 is applied to a frame pulse gate 51. A 30 cycle frame pulse generated in the video playback circuits 19 in response to the video signal reproduced from the tape 10 by head wheel 16 is also applied to the frame pulse gate 51 via lead 53. A pulse appearing at the output of the frame pulse gate 51 is applied through a gate pulse amplifier 52 to the binary stages 34, 35 and 36. The frame pulse gate 51 output pulse is also applied through the amplifier 52 so as to set the bistable gate driver 50.

Figure 3:
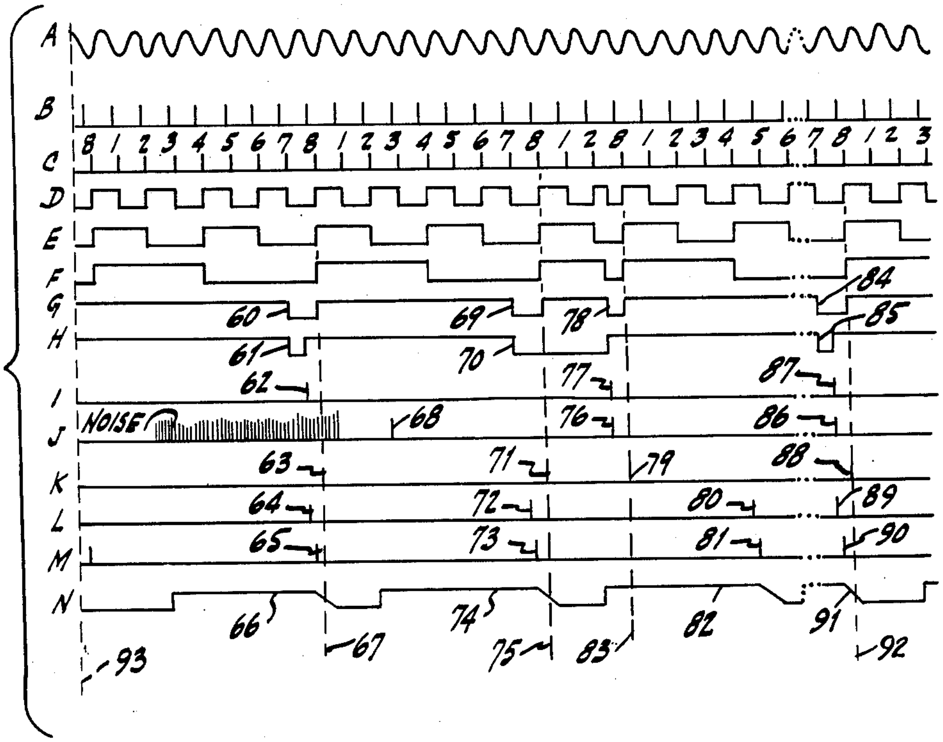
FIGURE 3 is a series of waveforms useful in describing the operation of the embodiment shown in FIGURE 1.

The operation of the servo system so far described will be best understood by reference to the waveforms shown in FIGURE 3. The 240 c.p.s. control signal recovered from the magnetic tape 10 by the control track head 23 is shown in waveform A of FIGURE 3. The timing spikes appearing at the output of the pulse former 30 are shown in waveform B of FIGURE 3, while the delayed pulses appearing at the output of the delay 32 are shown in waveform C of FIGURE 3. The pulses appearing in waveform C are numbered 1 through 8, indicating that 8 pulses appear at the output of the delay 32 for each frame of the television signal recorded on the tape 10.

The output of the first binary stage 34 in the counter 55 in response to the pulses of waveform C applied thereto is shown in waveform D of FIGURE 3. The output of the second binary stage 35 of the counter 55 is shown in waveform E of FIGURE 3, and the output of the third binary stage 36 in the counter 55 is shown in waveform F of FIGURE 3.

Assuming that the operation starts at the time of the first pulse number 1 shown at the far left of waveform C in FIGURE 3, the binary stages 34, 35 and 36 are responsive to the next five pulses, numbered 2 through 6, as shown in waveforms D, E and F, respectively, of FIGURE 3. Upon the application to the counter 55 of the next pulse, number 7, the three stages 34, 35 and 36 of the counter 55 are all reset or off, as may be seen by a comparison of waveforms D, E and F in FIGURE 3. The AND gate 48 senses this off coincidence and produces a pulse 60 shown in waveform G of FIGURE 3. The output pulse of AND gate 48 is applied through the amplifier 49 to the bistable gate driver 50. The input to the bistable gate driver 50 from AND gate 48 resets the bistable gate driver 50 as shown by pulse 61 in waveform H of FIGURE 3. The reset condition of the bistable gate driver 50 holds the frame pulse gate 51 open to a frame pulse applied at this time to the gate 51 from the video playback circuits 19.

During the start-up of the head wheel motor 15 and associated circuitry, the tape guide mechanism 18 is normally operated by the video playback circuits 19 via lead 52 to hold the tape 10 away from the head wheel 16 until the head wheel 16 has attained substantially the proper rotational speed. Therefore, during the period in which the head wheel motor 15 is coming up to its proper speed, no video signal is applied to the video playback circuits 19, and no frame pulse is applied to the frame pulse gate 51. However, the random noise present in the absence of the reproduced television signal will, as a practical matter, produce many rapidly recurring pulses from the frame pulse generator included in the video playback circuits 19. The input to the frame pulse gate 51 from the video playback circuits 19 will include the noise pulses as shown in waveform J of FIGURE 3. One of the random noise pulses applied to the frame pulse gate 51 will pass through the gate 51 substantially at the instant it is opened by the bistable gate driver 50. A pulse 62, shown in waveform I of FIGURE 3, appears at the output of the frame pulse gate 51.

The pulse 62 is applied through the amplifier 52 to the reset bus of the three binary stages 34, 35 and 36 in the counter 55. However, the output pulse 62 of the gate 51 at this time will have no effect upon the binary stages 34, 35 and 36 since they are already in their reset or off condition. The output pulse 62 from the frame pulse gate 51 is also applied to the bistable gate driver 50 through the amplifier 52 and sets the bistable gate driver 50, as indicated by the termination of pulse 61.

The next pulse, number 8, applied to the counter 55 causes the binary stages 34, 35 and 36 to be set, terminating the output pulse 60 from AND gate 48. A pulse 63, shown in waveform K of FIGURE 3, appears at the output of the pulse shaper 37 and is applied to the phase comparator 38 as a sample pulse.

The 30 cycle frame pulses of a locally generated television signal as produced from standard sync generator 39 are shown in waveform L of FIGURE 3, and the delayed pulses appearing at the output of the delay 41 are shown in waveform M of FIGURE 3. The trapezoid wave produced by the generator 40 in response to the pulses applied thereto and applied to phase comparator 38 is shown in waveform N of FIGURE 3. It will be assumed that the timing of the 30 cycle frame pulses produced by standard sync generator 39 is such that a pulse appears at the output of generator 39 at the time of the pulse 64 shown in waveform L. Pulse 64 is delayed, and a pulse 65, shown in waveform M, is applied to the trapezoid generator 40. The trapezoid wave output 66 of generator 40 applied to the phase comparator 38 will have a slope of, for example, 2000 microseconds duration, starting at the time of pulse 65. As indicated by the dashed line 67, the output or sample pulse 63 produced by the counter 55 and pulse shaper 37 will occur substantially at the center of the slope of the trapezoid wave 67, indicating phase alignment between the 30 cycle frame pulse produced by the standard sync generator 39 and the output pulses of the pulse shaper 37. The 30 p.p.s. pulse train at the output of the pulse shaper 37 is locked to the 30 cycle frame pulses of the locally generated television signal as produced by the standard sync generator 39, indicating that the tape speed as determined by the capstan motor 11 is correct.

Should the 30 cycle frame pulse produced by the standard sync generator 39 occur at some time other than that indicated by pulse 64 in waveform L, the sample pulse 63 produced by the counter and pulse shaper 37 will occur at some time removed from the center of the slope of the trapezoid wave 66. The error voltage produced by phase comparator 38 corresponding to the phase difference is applied to the modulator 43 via lead 42. The capstan motor 11 alters the speed of the tape 10 until phase coincidence is established as defined by the occurrence of the sample pulse appearing at the output of the pulse shaper 37 at the center of the slope of the trapezoid wave in the manner indicated by the dashed line 67 in FIGURE 3.

In recording the television signal using standard techniques, the tone wheel pulse from which the 240 c.p.s. control track signal is produced is generated when the head then moving across the tape reaches the center of the transverse track being recorded. This head records the vertical sync interval indicating the beginning of a television frame at the center of each eighth track which it records on the tape. Eight cycles of the control track signal corresponding to eight tone wheel pulses are therefore produced per television frame. By locking the 240 c.p.s. control track signal to the 30 cycle frame pulse produced by the standard sync generator 39, the speed of tape 10 is determined so that the head 17 scanning the tape 10 at the time the tone wheel pulse is produced by tone wheel 21 and pick-up 22 reproduces the recorded signal from the series of transverse tracks upon which the vertical sync interval appears. Ideally, the head will reproduce the vertical sync interval indicating the start of a television frame at the time of each eighth pulse generated by tone wheel 21 and pick-up 22. Using the generation of the tone wheel pulse as a reference, the same head used to record a transverse track on the tape 10 will scan that track in reproducing the recorded signal. This is assuming, of course, that the head wheel motor 15 is at this time driving the head wheel 16 at the proper rotational speed and with the correct phasing.

Only one cycle in each eight cycles of the 240 c.p.s. control track signal corresponds to the moment in time at which the vertical sync interval occurring at the start of a television frame is reproduced from the tape 10. The counter operates to generate a sampling pulse for each eight pulses received, making no distinction between the input pulses. The servo system including phase comparator 38 can as a result lock the 30 cycle frame pulse produced by the standard sync generator 39 and the 240 c.p.s. control track signal in any one of eight phase relationships. Since only one of the eight pulses received by the counter during an operating cycle thereof corresponds to the beginning of a television frame in the reproduced television signal, only one of the eight possible phase relationships will result in the reproduced television signal starting a frame substantially at the time of the 30 cycle frame pulse supplied from the standard sync generator 39. That is, the 30 cycle frame pulse supplied from the standard sync generator 39 must be locked to the cycles of the 240 c.p.s. control track signal corresponding to the start of a frame in the reproduced television signal.

Turning to the waveforms shown in FIGURE 3, the counter 55 after producing the sampling pulse 63, waveform K, begins a new operating cycle. It will be assumed that shortly after the counter has begun a new operating cycle, the guide mechanism 18 engages the heads 17 and the tape 10, causing the reproduced television signal to be applied to the video playback circuits 19 via lead 20. Noise and random pulses applied to the frame gate 51 from the video playback circuits 19 cease. A frame pulse, shown as pulse 68 in waveform J of FIGURE 3, is produced at the start of a television frame and is thereafter applied to the frame pulse gate 51 from the video playback circuits 19. The frame pulse will occur in time between succeeding input pulses applied to the counter 55. While the frame pulse is shown as occurring at the beginning of the counter's operating cycle between input pulses 2 and 3, it may occur at any time during the interval of the eight pulses counted. Since the counter 55 has not completed a seven count, the bistable gate driver 50 is in a set condition and the frame pulse gate 51 is non-responsive to the frame pulse 60 received. No change in operation takes place.

The counter 55 continues to count the input pulses received. When input pulse number 7 is received, the binary stages 34, 35 and 36 are again all placed in their reset or off conditions, as shown in waveforms D, E and F of FIGURE 3. AND gate 48 is responsive to the off coincidence to cause a pulse 69, waveform G to be applied to the bistable gate driver 50. The bistable gate driver 50 is reset, as indicated by the pulse 70 shown in waveform H of FIGURE 3, causing the frame pulse gate 51 to be responsive to a frame pulse applied thereto. However, no frame pulse appears at this time, the frame pulse 68 having occurred earlier in the operative cycle of the counter.

Upon the next input pulse being applied to the counter 55, pulse number 8, shown in waveform C, the three binary stages 34, 35 and 36 are set and a sample pulse 71, waveform K, is applied to the phase comparator 38 from the pulse shaper 37. In the meantime, a 30 cycle frame pulse 72, waveform L, will have been supplied from standard sync generator 39 and delayed by the fixed delay 41. The delayed pulse 73 is converted into a trapezoid wave 74 by the trapezoid generator 40 and fed to the phase comparator 38. The sample pulse 71 generated by the counter and the pulse shaper 37 occurs substantially at the center of the slope of the trapezoid wave 74, as indicated by dashed line 75 in FIGURE 3, maintaining the phase relationship previously established between the 30 cycle frame pulse produced by the standard sync generator 39 and the 240 c.p.s. control track signal.

Upon the binary stages 34, 35 and 36 being set in response to input pulse number 8, waveform C, AND gate 48 assumes its normal state as indicated by the termination of pulse 69, waveform G. Since no pulse has appeared at the output of frame pulse gate 51, the bistable gate driver 50 remains in its reset condition.

The counter 55 begins a new operating cycle upon the reception by binary stage 34 of the next input pulse. Following the reception by the counter of the input pulse number 2, a frame pulse 76, waveform J, is applied to frame pulse gate 51 from the video playback circuits 19, indicating the start of a new television frame in the reproduced television signal. Frame pulse gate 51 is responsive to the frame pulse 76 due to the reset condition of the bistable gate driver 50 at this time. A pulse 77, waveform I, appearing at the output of the frame pulse gate 51 is applied to the reset bus of the three binary stages 34, 35, 36. The three binary stages 34, 35, 36 all assume their reset or off condition if not already in this condition. As shown in waveforms D, E and F of FIGURE 3, the binary stages 34, 35, 36 are made to assume the state which they would normally have assumed only upon the reception of the seventh input pulse in the current operating cycle.

AND gate 48 is responsive to the off coincidence condition of the binary stages 34, 35 and 36 to apply a pulse 78, waveform G, to the bistable gate driver 50. The pulse 77, waveform I, appearing at the output of frame pulse gate 51 is also applied to the bistable gate driver 50. The pulse 77 is timed with respect to the leading edge of the pulse 78 applied to the bistable gate driver 50 from the AND gate 48 so that the bistable gate driver 50 is made to assume its set condition. This is indicated by the termination of the pulse 70, waveform H. The frame pulse gate 51 is thus held non-responsive to any spurious pulses that might be applied to the frame pulse gate 51 from the video playback circuits 19 following the frame pulse 76.

The next input pulse applied to the counter becomes, in effect, pulse number 8 in the counters operating cycle. The three binary stages 34, 35 and 36 are all set. A sample pulse 79, waveform K, is applied to the phase comparator 38 from the pulse shaper 37. Since no change has been made in the timing of the 30 cycle frame pulses supplied by the standard sync generator 39, a frame pulse is generated at the time of the pulse 80, shown in waveform L of FIGURE 3. The delayed pulse 81, waveform M is converted into a trapezoid wave 82, waveform N, by the trapezoid wave generator 40 and applied to the phase comparator 38. The sample pulse 79, waveform K, generated by the counter 55 and pulse shaper 37 will occur at a time removed from the slope of the trapezoid wave 82, as indicated by the dashed line 83 in FIGURE 3. An error voltage corresponding to the phase difference between the pulse 79, waveform K, and the center of the slope of trapezoid wave 82, waveform N, is applied to the modulator 43 via lead 42.

The speed of the capstan motor 11 is altered in accordance with the error voltage generated by the phase comparator 38. A corresponding change takes place in the speed of the tape 10, causing a slippage to occur between the transverse tracks recorded on the tape 10 and the heads 17 on head wheel 16. The counter 55 is operated in the manner described upon each succeeding frame pulse being received by the frame pulse gate 51, the phase comparator 38 produces an error voltage corresponding to the phase difference existing between the trapezoid wave and the sample pulse applied thereto. This operation will continue until the sample pulse is again timed to occur at the center of the slope of the trapezoid wave. As indicated by the dotted sections of waveforms A through N in FIGURE 3, this rephasing action will take place over several operating cycles of the counter 55. The time required to complete the rephasing depends upon the degree of phase difference originally existing between the sample pulse and the trapezoid wave.

Once the rephasing is completed, the operation will maintain the proper phase relationship. At the reception of the seventh input pulse received within the current operating cycle, binary stages 34, 35, 36 are placed in their reset or off condition. AND gate 48 produces a pulse 84, waveform G, causing the bistable gate driver 50 to be placed in its reset condition. The bistable gate driver 50 by assuming a reset condition as indicated by pulse 85, waveform H, causes frame pulse gate 51 to be responsive to a frame pulse applied thereto. Due to the rephasing of the servo loop in the manner described, a frame pulse 86, waveform J, now occurs at this time. A pulse 87, waveform I, appearing at the output of the frame pulse gate 51 is applied to the binary stages 34, 35 and 36. Since the binary stages 34, 35 and 36 are now in their reset or off condition, no change in the operation of the counter 55 takes place. It is to be noted that if any spurious noise pulses should pass through the frame pulse gate 51 at this time, the operation of the counter 55 and associated circuits is not disturbed since a pulse was expected anyway. Upon the next input pulse being received, pulse number 8, a sample pulse 88, waveform K, is applied from the output of pulse shaper 37 to phase comparator 38.

A frame pulse 89, waveform L, is applied as delayed pulse 90, waveform M, from the standard sync generator 39 to the trapezoid generator 40. The sample pulse 88 occurs substantially at the center of the slope of the trapezoid wave 91, as indicated by the dashed line 92 in FIGURE 3.

The 240 c.p.s. control track signal and the 30 cycle frame pulse generated by the standard sync generator 39 are now locked in the correct phase relationship. The pulses produced from the cycles in the 240 c.p.s. control track signal corresponding to the time that a new frame begins in the reproduced television signal are the eighth input pulses to the counter 55 in each operating cycle thereof and thus correspond to the sample or output pulse produced by the counter. The frame pulses generated from the reproduced television signal are in substantial synchronism with the frame pulses generated from a local television signal as produced from the standard sync generator 39. The servo loop including counter 55 and phase comparator 38 will continue to maintain the established phase relationship. A frame pulse is applied to the frame pulse gate 51 each time the frame pulse gate 51 is made responsive thereto, providing a continuing check on the speed of the tape 10. When a splice in the tape 10 or other change in phase changes the position of the frame pulse, the frame pulse gate 51 will be made responsive to a frame pulse and will remain in this condition until a new-phase frame pulse is received. The binary stages 34, 35 and 36 will be reset by the output pulse of the frame pulse gate 51, and the servo loop will again lock in the proper phase.

Reference has been made to the use of variable delay 32 and fixed delay 41. The 240 c.p.s. sine wave recorded on the control track of tape 10 is converted to a cosine wave by the differentiation that normally occurs when a tape is played back. Since differentiation is equivalent to a 90° phase shift, the control signal shown in waveform A of FIGURE 3 is shifted approximately 90° with respect to the original control track signal. The reproduced control track signal will still maintain a precise relationship to the original television signal. The frame pulses supplied by the standard sync generator 39 should occur at the peak of the reproduced 240 c.p.s. control track signal in the manner shown by the dashed line 93 in FIGURE 3. Since a 90° phase shift at 240 c.p.s. is approximately 1000 microseconds, the pulses produced by pulse former 30 are each delayed substantially 1000 microseconds with respect to the time of the frame pulses. The sample pulse which appears at the output of the pulse shaper 37 and corresponds to a frame pulse generated from the reproduced television signal normally follows by approximately 1000 microseconds the frame pulse supplied by standard sync generator 39 when the servo loop is properly phased. The sample pulse thus occurs substantially at the center of the 2000 microsecond slope of the trapezoid wave.

As a practical matter, the reproduced control track signal may be shifted some amount other than 90° with respect to the original control track signal due primarily to mechanical misalignment of the control track heads. By inserting the variable delay 32, and the fixed delay 41 in the two parallel paths of the servo loop, it is possible for an operator to either delay or advance the frame pulses produced by standard sync generator 39 and the pulses of the 240 p.p.s. pulse train relative to one another. In this manner, the operator can position the sample pulse at the center of the slope of the trapezoid wave when the servo loop is properly phased, compensating for the error in the reproduced control track signal.

So far, the servo system of the invention has provided for the substantial frame-by-frame lock-up of a reproduced television signal and a locally generated televsion signal. That is, each frame of the reproduced television signal will occur substantially at the same time as the frame pulse applied from the standard sync generator 39. If, in fact, the vertical sync interval of the reproduced television signal, is recorded at the center of the transverse track upon which it appears, then, the vertical sync intervals in the reproduced television signal will also be substantially locked to the vertical sync intervals in the locally generated television signal. If a line-by-line lock-in is established, accurate synchronism and precise phasing between the two television signals is obtained, permitting the formation of a television signal by switching between the two signals. A minimum of discontinuity and distortion is introduced in the composite signal.

As a practical matter, however, errors of several television lines duration can occur between the vertical sync intervals of the reproduced and locally generated television signals. This results primarily from the vertical sync interval being recorded on the tape 10 to one side or the other of the transverse track center. Before a useful line-by-line lock-in can be achieved, this error in the timing of the vertical sync intervals must be corrected.

A servo system by which this correction can be made is shown in FIGURE 1. As head wheel motor 15 rotates the head wheel 16, the pulses produced once per each complete revolution of the head wheel 16 are applied over a lead 100 to a delay 101. Delay 101 may be a monostable multivibrator or other structure for delaying by a fixed amount the pulse train applied thereto. The delayed pulse train appearing at the output of delay 101, is applied to tone wheel velocity control 102. The tone wheel velocity control 102 is of a type which functions to provide an error signal when the rate or frequency of a pulse train applied thereto varies from a given rate. In the present application, a 240 p.p.s. pulse train is applied to the tone wheel velocity control 102 from pick-up 22 when head wheel motor 15 is operating at the proper speed. The tone wheel velocity control 102 generates an error signal corresponding to the difference between the frequency of the pulses applied thereto and the correct frequency of 240 p.p.s. One example of a tone wheel velocity control 102 suitable for use in the invention is described in application Serial No. 809,017, filed April 27, 1959, by James R. Hall and entitled "Control Systems."

The 60 cycle field pulse representing the timing of the vertical sync interval in the reproduced television signal is applied from the video playback circuits 19 to a phase comparator stage 104 designated as tape vertical alignment. The 60 cycle field pulse representing the timing of the vertical sync interval in a television signal generated from the standard sync generator 39 is applied via lead 127 through a delay 105 to a square wave multivibrator 106. The square wave output of the multivibrator 106 is applied to a second input of the tape vertical alignment 104.

The tape vertical alignment 104, which may include a diode-bridge comparator using the technique, wherein a sample pulse straddles the transition of a square wave, produces an error voltage which is applied as a control signal to a variable delay 107. The 60 cycle field pulse supplied by the standard sync generator 39 is also fed over lead 127 and a lead 108 to the variable delay 107. The variable delay 107, which may be a multivibrator or other structure the timing of which is controllable, acts to vary the timing of the 60 cycle field pulse applied thereto from the standard sync generator 39 in accordance with the control signal generated by the tape vertical alignment 104. The pulse train appearing at the output of the variable delay 107 is applied to the tone wheel phase control 103.

The pulses generated by the tone wheel 21 and pick-up 22 and delayed by delay 101 are also applied to the tone wheel phase control 103. Tone wheel phase control 103 includes a phase comparator which compares by the sample-slope technique, for example, the phase of the tone wheel pulses and the phase of the 60 cycle field pulses applied thereto from the variable delay 107, producing an error signal in accordance with any phase difference between the two pulse trains. One example of a tone wheel phase control 103 suitable for use in the present invention in association with the tone wheel velocity control 102 is described in the above application Serial No. 809,017, filed Apr. 27, 1959, by James R. Hall and entitled "Control Systems."

The respective outputs of the tone wheel velocity control 102 and the tone wheel phase control 103 are applied to an adder 109. The composite signal appearing at the output of adder 109 is applied to a sawtooth generator 114 via the contact 111 and armature 112 of a relay 113. The 15,750 cycle horizontal sync pulses supplied by the standard sync generator 39 are applied to the sawtooth wave generator 114 over a lead 115. The sawtooth wave appearing at the output of generator 114 is applied to the clipper 110.

The sawtooth wave generator 114 may be of conventional design and includes, for example, a circuit arrangement by which the charging and discharging times of a capacitance are controlled. The slope of the leading edge of the sawtooth waves generated is determined according to the error signal supplied to the sawtooth wave generator 114 from the adder 109. Since the time of the trailing edge of the sawtooth waves remains constant, sawtooth wave generator 114 acts to generate a series of sawtooth waves having a frequency of 15,750 c.p.s. and verying in amplitude according to the error signal. The clipper 110 functions to square-off the top of the sawtooth waves supplied thereto at a fixed level. The output of the clipper 110 is, in effect, a series of pulses of constant amplitude and varying in width according to the error signal supplied to the generator 114 from the adder 109. The pulse train appearing at the output of the clipper 110 is applied to a pair of modulators 116, 117.

The output of a 480 cycle constant source 118 is applied to a +45° phase shifter 119 and to a −45° phase shifter 120. Modulator 116 is connected across the output of the +45° phase shifter 119, and modulator 117 is connected across the output of the −45° phase shifter 120. The modulators 116, 117 act as controllable shunts across the respective outputs of the phase shifters 119, 120. The 480 c.p.s. sine wave appearing at the outputs of the respective phase shifters 119, 120 are chopped at the 15,750 cycle rate of the clipped sawtooth wave applied to the modulators 116, 117. Modulators 116, 117 act, in effect, as on-off load resistances, the time interval during which resistance is shunted across the outputs of phase shifters 119, 120 depending upon the width of the clipped sawtooth waves. The 480 c.p.s. sine waves at the outputs of phase shifters 119, 120 are, in effect, converted into a series of pulses varying in amplitude at the 480 c.p.s. rate and varying in width according to the error signal fed to sawtooth wave generator 114. In this manner, a low frequency component, represented by the varying width of the segments in the chopped 480 c.p.s. sine waves, is inserted in the sine wave output of the phase shifters 119, 120, the low frequency component being determined by the error signal applied to the sawtooth wave generator 114 from the adder 109.

The output signal of the phase shifter 119 including the low frequency component inserted therein by the operation of modulator 116 is fed through an emitter-follower 121 to a 5 kc. (kilocycle) low-pass filter 122. The low pass filter 122 removes the 15,750 cycle switching component, and the remaining low frequency component inserted by the operation of modulator 116 is applied to a motor drive 123. Similarly, the output signal of phase shifter 120 including the low frequency component inserted by the operation of the modulator 117 is applied through an emitter-follower 124 to a 5 kc. low pass filter 125. The low-pass filter 125 removes the 15,750 cycle switching component, and the low-frequency component provided by the operation of the modulator 117 is applied to the motor drive 123. The motor drive 123 includes suitable structure such as a so-called Scott-connected transformer for converting the two signals applied thereto in phase quadrature into three phase power. The three phase power generated by the motor drive 123 is applied to the head wheel motor 15 over connections represented by lead 126.

Upon power first being applied at start-up, the tone wheel velocity control 102 senses that the head wheel motor 15 is motionless. A corresponding error signal appears at the output of the tone wheel velocity control 102 and is applied to the sawtooth wave generator 114. Modulators 116, 117 function in response to the clipped sawtooth wave applied thereto to cause full power to be applied to the head wheel motor 15 by the motor drive 123. In this manner, the head wheel motor 15 is rapidly brought up to the proper velocity. During the time that the head wheel motor 15 is being brought up to the proper speed under the control of the tone wheel velocity control 102, an error signal appearing at the output of tone wheel phase control 103 and included in the composite error signal applied to sawtooth wave generator 114 is substantially suppressed by the saturation characteristic of the modulators 116, 117. This is necessary because the phase error signal reverses many times as the head wheel motor 15 accelerates. Each reversal in phase would decelerate the head wheel motor 15, thereby greatly increasing the time required to bring the head wheel motor 15 up to the proper speed.

When the head wheel motor 15 has reached the proper speed, as indicated by the pulse train at the input of the tone wheel velocity control 102 attaining a repetition rate of 240 p.p.s., the modulators 116 and 117 are no longer controlled by a large velocity error signal, but become responsive to smaller changes in the width of the clipped sawtooth waves applied thereto in accordance with an error signal appearing at the output of the tone wheel phase control 103. The guide mechanism 18 will at this time have brought the heads 17 into contact with tape 10, and a reproduced television signal is applied to the video playback circuits 19. Also, the capstan servo loop previously described will have established substantial frame-by-frame lock-up of the reproduced and locally generated television signals.

While the guide mechanism 18 is shown as being under the control of the video playback circuits 19, the guide mechanism 18 can be operated from the output of the tone wheel velocity control 102. When the output of the tone wheel velocity control 102 indicates that the head wheel 16 is rotating at substantially the proper speed, this condition can be sensed and the guide mechanism 18 made to engage the heads 17 and tape 10.

The tape vertical alignment 104 functions to compare the 60 cycle field pulse of the reproduced television signal and the square wave applied thereto from the multivibrator 106. The delay 105 is determined so as to delay the 60 cycle field pulse supplied by the standard sync generator 39 a sufficient amount to cause the 60 cycle field pulse of the reproduced television signal to straddle the leading edge or transition of the square wave when the two trains of 60 cycle field pulses are locked in phase. When the 60 cycle field pulse of the reproduced television signal occurs before the transition of the square wave, an error voltage shifted in one direction by a corresponding amount is applied to the variable delay 107. When the 60 cycle field pulse of the reproduced television signal follows the transition, the error voltage is shifted in the other direction by an amount corresponding to the phase error. The variable delay 107, therefore, functions to shift in time the 60 cycle field pulses supplied by the standard sync generator 39 an amount determined by the phase error between the 60 cycle field pulse of the reproduced television signal and the 60 cycle field pulse of a television signal generated from the standard sync generator 39.

Tone wheel phase control 103 is responsive to the delayed 60 cycle field pulses applied thereto from the variable delay 107 to generate a phase error signal which corresponds to the phase difference between the two 60 cycle field pulse trains. Delay 101 located in the other parallel path of the servo loop serves as a compensating delay and allows the change in timing produced by the variable delay 107 to appear in the tone wheel phase control 103 as either advance or delay, permitting the proper phase comparison to be made by the tone wheel control 103. Sawtooth generator 114, clipper 110, modulators 116, 117 and the motor drive 123 are responsive to the phase error signal generated by the tone wheel phase control 103 to bring about a corresponding correction in the phase of the head wheel motor 15, minimizing the phase error. The head wheel motor 15 is made to assume a proper velocity and phase such that the 60 cycle field pulse corresponding to the vertical sync interval in the reproduced television signal will occur substantially at the time of the 60 cycle field pulse corresponding to the vertical sync interval in the locally generated television signal. The tone wheel phase control 103 by comparing the 240 p.p.s. tone wheel signal and the controlled 60 c.p.s. field pulses applied thereto acts to cause the recorded vertical sync intervals to occur, in effect, at the center of the transverse tracks upon which they are recorded. In practice, a phase error between the two vertical sync intervals is reduced to less than one-half of a television line.

As shown in FIGURE 1, the 60 cycle field pulses of the reproduced television signal are also applied from the video playback circuits 19 to one input of a coincidence gate 130. The square wave generated by multivibrator 106 in response to the 60 cycle field pulses supplied by the standard sync generator 39 are fed to a pulse former 131. The pulses appearing at the output of the pulse former 131 are applied to a second input of the coincidence gate 130. When the phase error between 60 cycle field pulses of the reproduced television signal and the 60 cycle field pulses supplied from the standard sync generator 39 has been reduced to a minimum, the coincidence gate 130 detects the substantially simultaneous occurrence of the pulses in the two pulse trains. The coincidental appearance of a pulse at the coincidence gate 130 from the video playback circuits 19 and from the pulse former 131 causes an output pulse to be applied from the coincidence gate 130 to a multivibrator 132.

The square wave appearing at the output of the multivibrator 132 is applied to a relay driver 133. The relay driver 133 is connected to the winding 134 of relay 113. The relay driver 133 has a time constant such that at least six output pulses from the coincidence gate 130 are required before the winding 134 of relay 113 is energized. Multivibrator 132 merely serves to deliver sufficient power to the relay driver 133 for the energization of winding 134. The coincidence gate 130, therefore, acts to sense when the vertical syn intervals of the reproduced and locally generated television signal are substantially locked in phase. The vertical sync interval of the reproduced television signal will be within one-half television line of precise coincidence with the vertical sync signal generated by the standard syn generator 39. When this condition exists, winding 134 is energized, the relay 113 is operated to move armature 112 from contact 111 to contact 135.

All that remains at this point is to provide a line-by-line lock between the two television signals. Accordingly, the 15,750 cycle horizontal sync pulses of the reproduced television signal are applied from the video playback circuits 19 to a conventional phase comparator 136. The 15,750 cycle horizontal sync pulses of the locally generated television signal as produced by the standard sync generator 39 are applied over lead 115 to a trapezoid generator 137. The phase comparator 136 compares the pulses applied thereto from the video playback circuits 19 with the slope of the trapezoid waves generated by the trapezoid generator 137. An error signal appears at the output of phase detector 136 corresponding to a phase difference between the two horizontal sync pulse trains. The error signal is fed over the path including contact 135 and armature 112 of relay 113 to the clipper 110. The speed and phase of the head wheel motor 15 is controlled in accordance with the error signal appearing at the output of the phase detector 136. In this condition, the television signal recorded on the tape 10 is used to control the speed of the head wheel motor 15. The servo loop is effectively closed around the equipment which originally recorded the television signal on the tape 10. Any jitter or timing errors appearing in the recorded signal will be substantially reduced.

Should any change in the operation occur such that the vertical sync intervals are no longer locked in phase, the relay driver 133 is responsive to the absence of a given number of pulses which would otherwise appear at the output of coincidence gate 130 to deenergize winding 134 of relay 113. Armature 112 will again engage contact 111. The tape vertical alignment 104, as well as the tone wheel velocity control 102 and tone wheel phase control 103, are placed in the servo loop so as to again lock-in the vertical sync intervals. The coincidence gate 130 will detect the reestablishment of the correct phasing, and relay 113 is operated by relay driver 133 in the manner described.

By the use of the servo system of the invention, it is possible to reproduce a recorded signal with great stability. A television signal reproduced from a magnetic tape under the control of a servo system constructed according to the invention can be superimposed upon a locally generated television signal or compared therewith to form a composite television signal in which little or no distortion occurs as a result of the switching between the two signals.

What is claimed is:

1. In combination, a source of a first signal including a timing component,
   - a second source of a second signal including a timing component, said first and second signals being of the same frequency,
   - means to derive a third signal from the timing component in said first signal,
   - means to derive a fourth signal having the same frequency as said third signal from the timing component in said second signal,
   - comparing means responsive to said third and fourth signals for producing an error signal in accordance with a phase error between said third and fourth signals,
   - a variable delay responsive to said fourth signal and to said error signal to change the timing of said fourth signal according to said error signal,
   - control means responsive to said delayed fourth signal and coupled to said first source so that said first source is operated to change the timing of the timing component in said first signal and therefore said third signal in the proper sense to reduce said error signal,
   - further means responsive to said third and fourth signals for producing an output signal upon said first and second signals being substantially locked in phase and frequency,
   - and means responsive to said output signal for releasing said first source from control by said control means so as to prevent any further change in the timing of said third signal by the operation of said control means and said first source.

2. A system for synchronizing a first television signal and a second television signal, said television signals each including at least field synchronizing components, said system comprising, in combination, a source of a first television signal including means for deriving a third signal from the field synchronizing components in said first television signal, a second source of a second television signal including means for deriving a fourth signal from the field synchronizing components in said second television signal, comparing means responsive to said third and fourth signals for producing an error signal in accordance with the phase error therebetween, a variable delay responsive to said fourth signal and to said error signal for changing the timing of said fourth signal according to said error signal, control means responsive to said fourth signal as processed by said variable delay and coupled to said first source for operating said first source to change the timing of said first television signal and therefore the timing of said third signal in the proper sense to reduce said error signal, further means responsive to said third and fourth signals for producing an output signal upon said third and fourth signals being substantially locked in phase and frequency, and means responsive to said output signal for releasing said first source from control by said control means so that the timing of said first television signal is independent of the operation of said control means.

3. A system for synchronizing a first television signal and a second television signal, said television signals each including at least field and line synchronizing components, said system comprising, in combination, a source of a first television signal including means for deriving a third signal from the field synchronizing components in said first television signal, a second source of a second television signal including means for deriving a fourth signal from the field synchronizing components in said second television signal, comparing means responsive to said third and fourth signals for producing an error signal in accordance with the phase error therebetween, a variable delay responsive to said fourth signal and to said error signal for changing the timing of said fourth signal according to said error signal, control means responsive to said fourth signal as processed by said variable delay and coupled to said first source for operating said first source to change the timing of said first television signal and therefore the timing of said third signal in the proper sense to reduce said error signal, further means responsive to said third and fourth signals for producing an output signal upon said third and fourth signals being substantially locked in phase and frequency, said first source including means for deriving a fifth signal from the line synchronizing components in said first television signal and said second source including means for deriving a sixth signal from the line synchronizing components in said second television signal, a second comparing means responsive to said fifth and sixth signals to produce a second error signal in accordance with the phase error therebetween, and means responsive to said output signal for releasing said first source from control by said control means and thereafter causing said first source to determine the timing of said first television signal according to said second error signal.

4. In apparatus for reproducing a television signal including at least field synchronizing components recorded on a magnetic tape, a system for substantially synchronizing said television signal as reproduced from said tape and a second television signal including at least field synchronizing components comprising, in combination, signal reproducing means for reproducing the television signal from said tape and for deriving a third signal from said field synchronizing components, a tape transport for positioning said tape in cooperative relationship with said signal reproducing means so that the television signal is reproduced thereby, means including a motor for moving said tape past said signal reproducing means, input means to which a fourth signal derived from the field synchronizing components in said second television signal is applied, comparing means coupled between said signal reproducing means and said input means responsive to said third and fourth signals for producing an error signal in accordance with the phase error between said third and fourth signals, a variable delay responsive to said fourth signal and said error signal to change the timing of said fourth signal according to said error signal, control means coupled between said signal reproducing means and said variable delay responsive to said fourth signal as processed by said variable delay to cause said signal reproducing means to change the timing of said reproduced television signal and therefore the timing of said third signal in the proper sense to reduce said error signal, means responsive to said third and fourth signals to produce an output signal upon said third and fourth signals being substantially locked in phase and frequency, and means responsive to said output signal for releasing said signal reproducing means from control by said control means so that the timing of said reproduced television signal as produced by said signal reproducing means is independent of the operation of said control means.

5. In apparatus for reproducing a television signal including at least field and line synchronizing components recorded on a magnetic tape, a system for substantially synchronizing said television signal as reproduced from said tape and a second television signal including at least field and line synchronizing components comprising, in combination, signal reproducing means for reproducing the television signal from said tape and for deriving a third signal from said field synchronizing components and a fourth signal from said line syncrhonizing components, a tape transport for positioning said tape in cooperative relationship with said signal reproducing means so that the television signal is reproduced thereby, means including a motor for moving said tape past said signal reproducing means, input means to which a fifth signal derived from the field synchronizing components in said second television signal is applied, comparing means coupled between said signal reproducing means and said input means responsive to said third and fifth signals for producing an error signal in accordance with the phase error between said third and fifth signals, a variable delay responsive to said fifth signal and said error signal to change the timing of said fifth signal according to said error signal, control means coupled between said signal reproducing means and said variable delay responsive to said fifth signal as processed by said variable delay to cause said signal reproducing means to change the timing of said reproduced television signal and therefore the timing of said third signal in the proper sense to reduce said error signal, means responsive to said third and fifth signals to produce an output signal upon said third and fifth signals being substantially locked in phase and frequency, a further input means responsive to a sixth signal derived from the line synchronizing components in said second television signal, a second comparing means responsive to said fourth and sixth signals for producing a second error signal in accordance with a phase error therebetween, and means responsive to said output signal for releasing said signal reproducing means from control by said control means and thereafter causing said signal reproducing means to determine the timing of said reproduced television signal according to said second error signal.

6. In apparatus for reproducing a television signal including at least field synchronizing components from a magnetic tape, said television signal being recorded on a plurality of longitudinally spaced transverse tracks, a system for substantially synchronizing said television signal as reproduced with a second television signal comprising, in combination, a rotatable assembly carrying a plurality of magnetic heads, a tape transport for moving the tape in cooperative relationship with said magnetic heads so that the heads sweep across the tape to reproduce said television signal from said transverse tracks, means including a motor for driving said rotatable assembly, means including a second motor for moving said tape past the rotatable assembly, means coupled to the magnetic heads on said rotatable assembly and responsive to said reproduced television signal for producing a first pulse train including field pulses derived from said field synchronizing components, input means adapted to receive a second pulse train derived from the field synchronizing components in a second television signal, comparing means responsive to said first and second pulse trains to produce an error signal in accordance with the phase error therebetween, a variable delay responsive to said error signal and said second pulse train to change the timing of said second pulse train according to said error signal, generating means associated with said rotatable assembly serving to generate a third pulse train of a frequency directly dependent upon the rate of rotation of the rotatable assembly, control means responsive to said third pulse train and to said modified second pulse train as produced by said variable delay and coupled to said first motor for determining the velocity and phase of said first motor and therefore said rotatable assembly according to the phase difference between said modified second pulse train and said third pulse train, the velocity and phase of said rotatable assembly being determined by said control means to change the timing of said reproduced television signal and therefore the timing of said first pulse train in the proper sense to reduce said error signal, further means responsive to said first and second pulse trains for producing an output signal upon said first and second pulse trains being substantially locked in phase and frequency, and means responsive to said output signal for releasing said first motor and said rotatable assembly from control by said control means so that the timing of said reproduced television signal is independent of the operation of said control means.

7. In apparatus for reproducing a television signal including at least field and line synchronizing components from a magnetic tape, said television signal being recorded on a plurality of longitudinally spaced transverse tracks, a system for substantially synchronizing said television signal as reproduced with a second television signal comprising, in combination, a rotatable assembly carrying a plurality of magnetic heads, a tape transport for moving the tape in cooperative relationship with said magnetic heads so that the heads sweep across the tape to reproduce said television signal from said transverse tracks, means including a motor for driving said rotatable assembly, means including a second motor for moving said tape past the rotatable assembly, means coupled to the magnetic heads on said rotatable assembly and responsive to said reproduced television signal for producing a first pulse train including field pulses derived from said field synchronizing components and a second pulse train including line pulses derived from said line synchronizing components, input means adapted to receive a third pulse train derived from the field synchronizing components in a second television signal and a fourth pulse train derived from the line synchronizing components in said second television signal, comparing means responsive to said first and third pulse trains to produce an error signal in accordance with the phase error therebetween, a variable delay responsive to said error signal and said third pulse train to change the timing of said third pulse train according to said error signal, generating means associated with said rotatable assembly serving to generate a fifth pulse train of a frequency directly dependent upon the rate of rotation of the rotatable assembly, control means responsive to said fifth pulse train and to said modified third pulse train as produced by said variable delay and coupled to said first motor for determining the velocity and phase of said first motor and therefore said rotatable assembly according to the phase difference between said modified third pulse train and said fifth pulse train, the phase of said rotatable assembly being determined by said control means to change the timing of said reproduced television signal and therefore the timing of said first pulse train in the proper sense to reduce said error signal, further means responsive to said first and third pulse trains for producing an output signal upon said first and third pulse trains being substantially locked in phase and frequency, a second comparing means responsive to said second pulse train and said fourth pulse train for providing a second error signal in accordance with the phase error therebetween, and means responsive to said output signal for disconnecting said first motor from control by said control means and thereafter causing the operation of said first motor to be determined according to said second error signal.

8. In apparatus for reproducing a television signal including line and field synchronizing components from a magnetic tape, said television signal being recorded on a plurality of longitudinally spaced transverse tracks, said tape also having recorded thereon a longitudinal control signal track bearing a precise phase relationship to said synchronizing components, a system for substantially synchronizing said television signal as reproduced with a second television signal comprising, in combination, a rotatable assembly carrying a plurality of magnetic heads, a tape transport for moving the tape in cooperative relationship with said magnetic heads so that the heads sweep across the tape to reproduce said television signal from said transverse tracks, a magnetic head for reproducing the control signal from said control signal track, means including a motor for driving said rotatable assembly, means including a second motor for moving said tape past the rotatable assembly and said control signal reproducing magnetic head, means coupled to the magnetic heads on said rotatable assembly and responsive to said reproduced television signal for producing a first pulse train including frame pulses derived from said synchronizing components, a second pulse train including field pulses derived from said field synchronizing component and a third pulse train including line pulses derived from said line synchronizing component, said first pulse train being of a frequency equal to a submultiple of the frequency of said control signal, a source of a second television signal including line and field synchronizing components, said source including means for producing a fourth pulse train including frame pulses derived from the synchronizing components in said second television signal, a fifth pulse train including field pulses derived from said field synchronizing component in said second television signal, and a sixth pulse train including line pulses derived from the line synchronizing component in said second television signal, a first control means responsive to said reproduced control signal, said first pulse train and said fourth pulse train for controlling the speed of said second motor and thereby the speed of said tape so as to establish substantial synchronism between said reproduced television signal and said second television signal on a frame-by-frame basis, generating means associated with said rotatable assembly serving to generate a seventh pulse train of a frequency directly dependent upon the rate of rotation of said rotatable assembly, comparing means responsive to said second pulse train and said fifth pulse train to produce an error signal in accordance with the phase error therebetween, a variable delay responsive to said fifth pulse train and said error signal to change the timing of said fifth pulse train according to said error signal, control means responsive to said seventh pulse train from said generating means and the modified fifth pulse train as provided by said variable delay and coupled to said first motor for determining the phase of said first motor and therefor said rotatable assembly according to the phase difference between said seventh pulse train and said modified fifth pulse train, the phase of said rotatable assembly being determined by said control means so that the timing of said reproduced television signal and therefore said second pulse train is changed in the proper sense to reduce said error signal, further means responsive to said second pulse train and said fifth pulse train for producing an output signal upon said second and fifth pulse trains being substantially locked in phase and frequency, a second comparing means responsive to said third pulse train and said sixth pulse train for producing a second error signal in accordance with the phase error therebetween, and means responsive to said output signal for disconnecting said first motor from control by said control means and thereafter causing the operation of first motor and said rotatable assembly to be determined according to said second error signal, whereby said reproduced television signal and said second television signal are accurately synchronized on a line-by-line basis.

9. In apparatus for reproducing a television signal including line and field synchronizing components from a magnetic tape, said television signal being recorded on a plurality of longitudinally spaced transverse tracks, said tape also having recorded thereon a longitudinal control signal track bearing a precise phase relationship to said synchronizing components, a system for substantially synchronizing said television signal as reproduced with a second television signal as claimed in claim 8, and wherein said control means includes a velocity control and a phase control, means to apply said seventh pulse train to said velocity control, said velocity control producing a control signal according to the difference between the frequency of said seventh pulse train and a given frequency corresponding to the proper velocity of said rotatable assembly, means to apply said seventh pulse train and said modified fifth pulse train to said phase control, said phase control producing a second control signal according to a phase difference between said seventh pulse train and said modified fifth pulse train, and means to combine said first and second control signals into a composite control signal, said composite control signal being applied to said first motor in the absence of said output signal so as to determine the velocity and phase of said first motor and said rotatable assembly.

10. A system for synchronizing a first signal and a second signal comprising, in combination, a source of a first signal, a second source of a second signal, comparing means coupled to said first and said second source for producing an error signal in accordance with a timing difference between said first and second signals, timing means coupled to said second source and to said comparing means for changing the timing of said second signal according to said error signal, switching means, control means coupled to said timing means and through said switching means to said first source responsive to said second signal as processed by said timing means for operating said first source to change the timing of said first signal in the proper sense to reduce said error signal, a second comparing means coupled to said first and said second source to produce an output signal upon the existence of a given timing relationship between said first and second signals, and means coupled between said second comparing means and said switching means responsive to said output signal for operating said switching means to prevent said control means from operating said first source through said switching means so as to make any further change in the timing of said first signal.

References Cited in the file of this patent

UNITED STATES PATENTS

| | | |
|---|---|---|
| 3,017,462 | Clark et al. | Jan. 16, 1962 |
| 3,059,049 | Johnson | Oct. 16, 1962 |